(12) United States Patent
Pagliaccio et al.

(10) Patent No.: US 12,331,495 B2
(45) Date of Patent: Jun. 17, 2025

(54) ACTUATED BACKFLOW PREVENTER AND FLUID CONTROL APPARATUS

(71) Applicant: Watts Regulator Co., North Andover, MA (US)

(72) Inventors: Joe Pagliaccio, North Andover, MA (US); Kevin Simon, Somerville, MA (US); Joseph Michael Burke, Deerfield, NH (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 17/674,381

(22) Filed: Feb. 17, 2022

(65) Prior Publication Data

US 2022/0259839 A1    Aug. 18, 2022

Related U.S. Application Data

(60) Provisional application No. 63/150,848, filed on Feb. 18, 2021.

(51) Int. Cl.
*E03B 7/07* (2006.01)
*E03C 1/10* (2006.01)
*F16K 31/02* (2006.01)

(52) U.S. Cl.
CPC ............ *E03B 7/077* (2013.01); *E03C 1/106* (2013.01); *F16K 31/02* (2013.01)

(58) Field of Classification Search
CPC ...................................... E03B 7/077
See application file for complete search history.

(56) References Cited

U.S. PATENT DOCUMENTS 3,561,474 A * 2/1971 Langley .................. F15C 1/003
                                                       137/557
3,972,504 A * 8/1976 DiSabatino, Jr. ....... F16K 15/03
                                                       251/83

(Continued)

FOREIGN PATENT DOCUMENTS

WO    2020023584 A1    1/2020

OTHER PUBLICATIONS

International Search Report and Written Opinion from corresponding PCT Appln. No. PCT/US2215992, dated Apr. 28, 2022.

(Continued)

*Primary Examiner* — Paul J Gray
(74) *Attorney, Agent, or Firm* — Grossman, Tucker, Perreault & Pfleger, PLLC (57) ABSTRACT

The present disclosure is directed to systems and methods useful for backflow prevention system that includes an actuated valve, a valve controller, one or more upstream sensors, and one or more downstream sensors. Upon detecting conditions conducive to backflow through the system using either or both the one or more upstream sensors, and the one or more downstream sensors, the valve controller causes the actuated valve to close. The system may be enhanced through the use of a qualifying check valve disposed between the actuated valve and the one or more downstream sensors to slow or impede backflow through the system. The system may be enhanced by inclusion of a run-out length between the actuated valve and the one or more downstream sensors to account for the latency in the actuator causing the valve to transition to the CLOSED position.

32 Claims, 3 Drawing Sheets

(56) References Cited

U.S. PATENT DOCUMENTS

| | | | |
|---|---|---|---|
| 5,425,393 A | 6/1995 | Everett | |
| 7,064,671 B2* | 6/2006 | Vanderah | G01F 1/42 |
| | | | 713/323 |
| 2003/0135334 A1 | 7/2003 | Engelmann | |
| 2005/0249631 A1 | 11/2005 | Schulz et al. | |
| 2013/0144202 A1 | 6/2013 | Field et al. | |
| 2013/0256570 A1* | 10/2013 | McHugh | F15B 15/088 |
| | | | 251/30.01 |
| 2015/0354520 A1* | 12/2015 | Bleyer | F02D 19/0621 |
| | | | 123/445 |
| 2016/0179109 A1* | 6/2016 | Iversen | F16K 37/005 |
| | | | 137/565.01 |
| 2017/0191681 A1 | 7/2017 | Loan et al. | |
| 2017/0278327 A1 | 9/2017 | Doughty et al. | |
| 2018/0141069 A1 | 5/2018 | Lemkin | |
| 2018/0214802 A1* | 8/2018 | Johnson | B01D 35/12 |
| 2018/0355589 A1 | 12/2018 | Stoianov et al. | |
| 2019/0086289 A1 | 3/2019 | Shaw, Jr. et al. | |
| 2019/0308485 A1* | 10/2019 | Renault | F02M 21/023 |
| 2020/0264067 A1 | 8/2020 | Lance et al. | |
| 2020/0265067 A1 | 8/2020 | Taschner | |
| 2020/0347944 A1* | 11/2020 | Lozitsky | F16K 5/0647 |
| 2020/0393324 A1* | 12/2020 | Rudd | F16K 37/0041 |
| 2021/0332898 A1 | 10/2021 | Cellemme et al. | |
| 2022/0146052 A1* | 5/2022 | Rimboym | F17D 3/01 |
| 2022/0252170 A1 | 8/2022 | Simon et al. | |

OTHER PUBLICATIONS

"LFF113FP Wireless Smart Flood Protection Shut Down Valve with SentrPlus Alert Technology", Watts, 2020.

"Model FCIS (Connected Flood Control System) Reduced Pressure Principle Assembly w/Integral Relief Valve Monitor and Automatic ACV Shutoff", Zurn Wilkins, Mar. 2019.

"Model ZCSM-PF and CSM-BTM Zurn Connected Pressure Monitor (ZCSM-PF) and optional Zurn Connected Flow Meter (ZCSM-BTM)" Zurn Plumbsmart, Aug. 2020.

"Series PVS-7000 Flood Protection Backflow System with SentryPlus Alert", Watts, 2020.

"Watts ACV 113-6RFP Flood Protection Shutdown Valve", Watts, 2000.

Office Action from corresponding U.S. Appl. No. 17/173,987 dated Apr. 11, 2023. 11 pages.

* cited by examiner

ACTUATED BACKFLOW PREVENTER AND FLUID CONTROL APPARATUS

CROSS REFERENCE TO RELATED APPLICATION

This application claims benefit of U.S. Provisional Application 63/150,848 filed Feb. 18, 2021, which is incorporated herein by reference in its entirety.

TECHNICAL FIELD

The present disclosure relates to fluid control systems, more specifically to actuated backflow preventers.

BACKGROUND

Fluid control systems are commonly employed for various reasons. One such example of a fluid control system includes backflow preventers. Backflow preventers permit a forward flow while preventing reverse flow. Typically, backflow preventers are packaged as an assembly that includes two check valves positioned in series. In addition, a plurality of smaller air bleed and test cock valves are fluidly coupled to the backflow prevent assembly to provide air bleeds, drain points, and test points. Typically, the check valves used in backflow preventers include spring loaded check valves, poppet valves, swing type check valves, which are usually heavy, cause a high pressure drop, and require significant installation space. Backflow preventers are often used to prevent contamination of commercial, residential, and municipal water distribution systems.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The actuated backflow prevention systems disclosed herein beneficially and advantageously combines sensor-based reverse flow detection with an actuated valve to minimize or eliminate the potential for reverse flow through the actuated valve. Where required by code or otherwise desirable, the actuated backflow prevention systems disclosed herein may be combined with a check valve to provide resistance to backflow through the valve, thereby accommodating the time for the actuator to transition the valve to a CLOSED position. The actuated backflow prevention systems disclosed herein may include one or more flow detection sensors capable of providing flow and/or pressure data to remote locations via one or more network connections. Backflow detection may be achieved using one or more of: upstream and downstream pressure sensors, upstream and downstream flow switches (e.g., paddle switches), and/or upstream and downstream mass or volumetric flowmeters (e.g., rotary wheel flowmeters). A valve controller may be used to detect the occurrence of a reverse flow condition based on the information provided by at least one of: one or more upstream sensors and/or one or more downstream sensors. The actuated valve may include an electrically actuated valve that receives power from an operably coupled energy storage device (e.g., a primary or secondary battery, supercapacitor, or ultracapacitor), an energy scavenging device, a solar energy collection device, or any combination thereof.

The actuated backflow prevention systems disclosed herein may beneficially include a low-pressure drop valve, such as a full port ball valve or butterfly valve capable of providing a rapid transition between the OPEN state and the CLOSED state. In embodiments, the actuated backflow prevention systems disclosed herein may use a positionable valve to provide both OPEN/CLOSED backflow prevention and downstream flow or pressure control.

A backflow prevention apparatus is provided. The apparatus may include: a valve having an inlet connection and an outlet connection; an actuator operably coupled to the valve; a valve controller operably coupled to the actuator, the valve controller to: receive a first input signal generated by one or more upstream sensors; receive a second input signal generated by a one or more downstream sensors; determine, using at least one of the first input signal or the second input signal whether a reverse flow condition exists downstream of the valve; and responsive to a determination that the reverse flow condition exists downstream of the valve, transition the valve to a CLOSED position.

Figure 1:
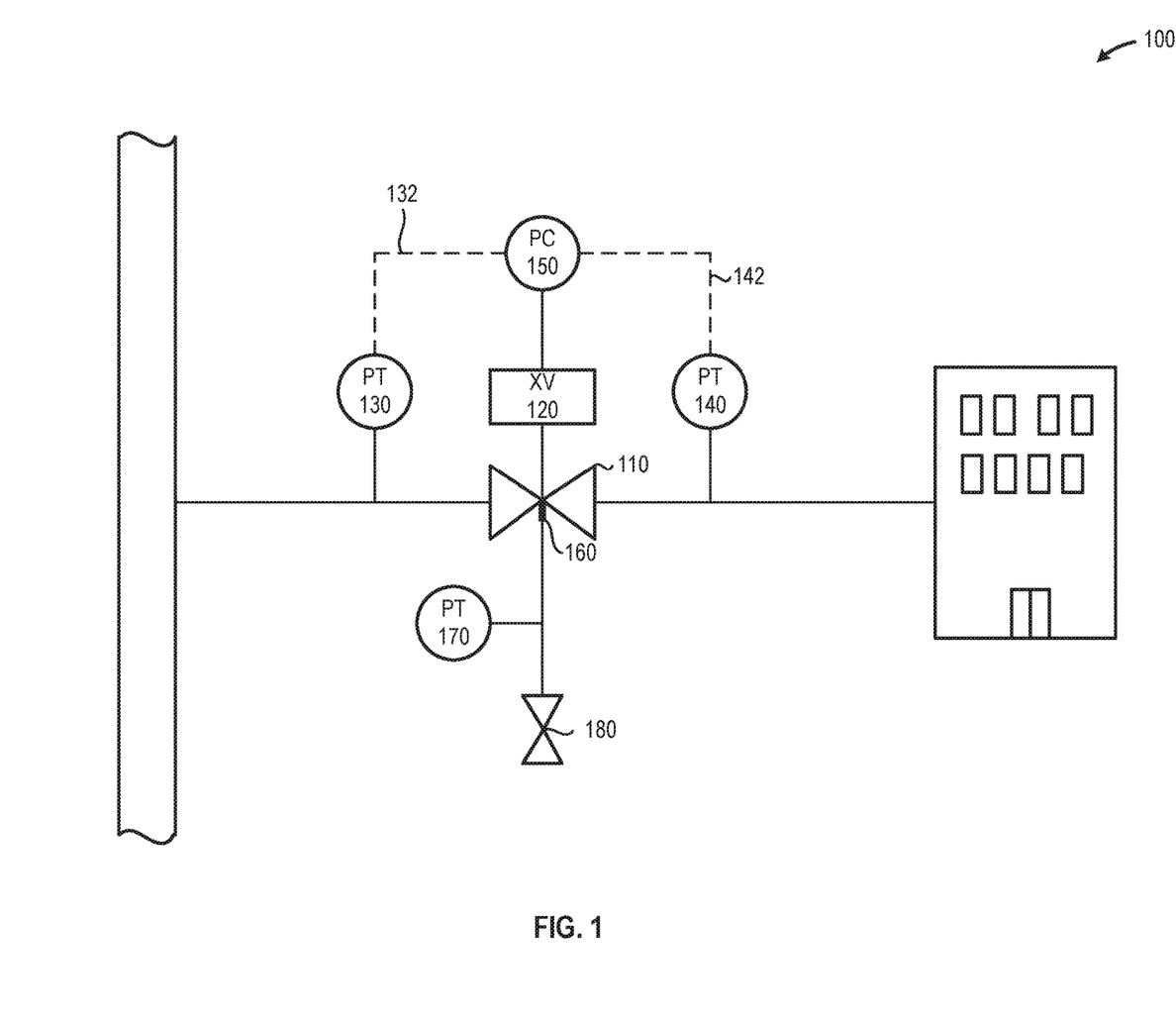
FIG. 1 is a schematic of an illustrative fluid control apparatus that includes a valve, an actuator operably coupled to the valve, one or more upstream sensors disposed upstream of the valve inlet connection, one or more downstream sensors disposed downstream of the valve discharge connection, and a valve controller, in accordance with at least one embodiment described herein.

FIG. 1 is a schematic of an illustrative fluid control apparatus/system. One example of the fluid control apparatus/system includes an actuated backflow prevention system 100. The actuated backflow prevention system 100 may include a valve 110, an actuator 120 operably coupled to the valve 110, one or more upstream sensors 130 disposed upstream of the valve inlet connection, one or more downstream sensors 140 disposed downstream of the valve discharge connection, and a valve controller 150, in accordance with at least one embodiment described herein. In addition, the valve 110 may include one or more test cocks 160. In at least some embodiments, one or more leakage sensors 170 may be fluidly coupled to the one or more test cocks 160.

In operation, the one or more upstream sensors 130 and/or the one or more downstream sensors 140 detect one or more process variables (pressure, temperature, mass flow, volumetric flow, etc.) of the fluid flowing through the valve 110. The one or more upstream sensors 130 communicates a signal 132 to a controller 150. The signal 132 includes information and/or data associated with the one or more process variables associated with the fluid present upstream of the valve inlet. The one or more downstream sensors 140 communicates a signal 142 to the controller 150. The signal 142 includes information and/or data associated with the fluid present downstream of the valve outlet. The controller 150 uses the information and/or data included in the signal 132 and the information and/or data included in the signal 142 to determine whether process conditions are conducive to a reverse flow through the valve 110 (i.e., "backflow"). Responsive to a determination that process conditions are conducive to a reverse flow through the valve 110, the controller 150 causes actuator 120 to position the valve in the CLOSED position. In at least some embodiments, the actuator 120 may pre-set or pre-position the valve 110 in a slightly closed position that creates a slight pressure drop (<0.5 psi; <1.0 psi; <3.0 psi; or <5.0 psi) through the valve 110 beneficially reducing the response time of the valve 110 in reaching the CLOSED position and halting the backflow through the valve 110.

In some embodiments, the valve 110 may include a quarter turn valve, such as a ball valve, plug valve, or butterfly valve. In other embodiments, the valve 110 may include a throttling valve such as a globe valve. In embodiments, the valve 110 may include a low pressure drop valve such as a full port ball valve. The valve body may include one or more materials such as carbon steel, stainless steel, bronze, cast iron, or brass. In embodiments, the valve 110 may include a wafer style valve for insertion between pipe flanges, a flanged valve, a threaded valve, or a solder-end connection valve. The valve 110 may be of any size. For example, the valve 110 may have a size of: 0.25 inches, 0.375 inches, 0.50 inches, 0.625 inches, 0.75 inches, 1 inch, 1.25 inches, 1.5 inches, 2 inches, 2.5 inches, 3 inches, 4 inches, 6 inches, 8 inches, or 10 inches. In embodiments, the valve 110 may include one or more test cocks 160.

The actuator 120 may include a pneumatic or electric actuator. In embodiments, the actuator 120 may include an alternating current powered, electrically operated, actuator operating at 120 VAC or 240 VAC. In embodiments, the actuator 120 may include a direct current powered, electrically operated, actuator operating at 24 VDC. The actuator 120 may receive power from a commercial, industrial, or municipal electric distribution system. The actuator 120 may include one or more energy storage devices, such as one or more primary or secondary batteries capable of providing sufficient power to cause the actuator 120 to drive the valve 110 to the CLOSED position, even in the absence of a prime power supply. The actuator 120 may include one or more energy collection devices, for example one or more energy scavengers that receives power from fluid movement through the valve 110 and/or one or more solar cells. In such embodiments, the actuator 120 may include one or more energy storage devices to collect and store the energy provided by the energy scavenger and/or the solar cells.

The one or more upstream sensors 130 includes any number and/or combination of sensors capable of measuring one or more process variables associated with the fluid flow upstream of the valve 110 and generating the output signal 132 that includes information and/or data representative of the measured one or more process variables. In embodiments, the one or more upstream sensors 130 may include one or more pressure sensors capable of measuring the pressure of the fluid flowing upstream of the valve 110 and generating an analog or digital output signal 132 that includes information and/or data representative of the measured fluid pressure. In embodiments, the one or more upstream sensors 130 may include a unidirectional or bi-directional paddle type flow switch capable of detecting the flow and/or direction of flow of the fluid upstream of the valve 110 and generating an analog or digital output signal 132 that includes information and/or data representative of the presence and/or direction of fluid flow upstream of the valve 110. In embodiments, the one or more upstream sensors 130 may include a mass flow sensor (ultrasonic sensor, Coriolis sensor, etc.) capable of detecting the mass of the fluid flowing upstream of the valve 110 and generating an analog or digital output signal 132 that includes information and/or data representative of mass and/or direction of the fluid flow upstream of the valve 110. In embodiments, the one or more upstream sensors 130 may include a volumetric flow sensor (vortex shedding, rotating paddle, etc.) capable of detecting the volume and or direction of the fluid flow upstream of the valve 110 and generating an analog or digital output signal 132 that includes information and/or data representative of the volumetric flowrate and/or direction of the fluid flow upstream of the valve 110.

The one or more downstream sensors 140 includes any number and/or combination of sensors capable of both measuring one or more process variables associated with the fluid flow downstream of the valve 110; and, generating the output signal 142 that includes information and/or data representative of the measured one or more process variables. In embodiments, the one or more downstream sensors 140 may include one or more pressure sensors capable of measuring the downstream pressure of the fluid flowing through the valve 110 and generating an analog or digital output signal 142 that includes information and/or data representative of the measured downstream fluid pressure. In embodiments, the one or more downstream sensors 140 may include a bi-directional paddle type flow switch capable of detecting a flow and a direction of flow of fluid downstream of the valve 110 and generating an analog or digital output signal 142 that includes information and/or data representative of the presence and/or direction of downstream fluid flow through the valve 110. In embodiments, the one or more downstream sensors 140 may include a mass flow sensor (ultrasonic sensor, Coriolis sensor, etc.) capable of both: detecting the mass of the fluid flow downstream of the valve 110; and, generating an analog or digital output signal 142 that includes information and/or data representative of mass and/or direction of fluid flow downstream of the valve 110. In embodiments, the one or more downstream sensors 140 may include a volumetric flow sensor (vortex shedding, rotating paddle, etc.) capable of detecting the volume and/or direction of the fluid flowing downstream of the valve 110 and generating an analog or digital output signal 142 that includes information and/or data representative of the measured volumetric flowrate and/or direction of the fluid flow downstream of valve 110.

The valve controller 150 may include any number and/or combination of pneumatic and/or electronic devices capable of causing the actuator 120 to position the valve 110 in at least an OPEN position or a CLOSED position. In embodiments, the valve controller 150 may include a positioner or similar device to permit the positioning of the valve 110 at one or more intermediate positions between the OPEN position and the CLOSED position. In embodiments, the valve controller 150 may include an electronic processor or controller capable of executing an instruction set that includes but is not limited to: receiving the one or more signals 132 and the one or more signals 142; performing one or more operations using the data included in the one or more signals 132 and the one or more signals 142; and, determining an appropriate position for the valve 110 based, at least in part, on the one or more operations. In some examples, the valve controller 150 may be configured to perform one or more operations using the data included in the one or more signals 132 and the one or more signals 142 and determine an appropriate position for the valve 110 such as, but not limited to, back flow prevention, pressure regulation (e.g., adjusting the valve 110 to maintain a desired pressure and/or pressure range) and/or flood protection (e.g., adjusting the valve 110 to reduce and/or eliminate flow in the event of flood detection event).

The valve controller 150 may therefore by operably coupled to the actuator 120 and may be configured to receive a first input signal 132 generated by one or more upstream sensors 130, receive a second input signal 142 generated by one or more downstream sensors 140, determine, using at least one of the first input signal 132 or the second input signal 142 whether a trigger event exists downstream of the valve 110, and responsive to a determination that the trigger event exists downstream of the valve 110, adjust a position of the valve 110 using the actuator 120. The trigger event may include one or more of a reverse flow condition, a flood condition, and/or a pressure downstream of the valve 110 is outside of a target (e.g., a pressure downstream of the valve 110 is above and/or below a threshold pressure/pressure range). The valve controller 150 may therefore be able to control the valve 110 in the event of one or more pre-defined conditions. In some example, the valve controller 150 may control the valve 110 in response to the detection of a backflow condition, an under and/or over pressure condition, and/or flood condition.

In some embodiments, the one or more upstream sensors 130 may include one or more pressure sensors and the one or more downstream sensors 140 may include one or more pressure sensors. In such embodiments, the valve controller 150 may receive a signal 132 containing information and/or data representative of the upstream/inlet pressure of the fluid from the one or more upstream sensors 130 and a signal 142 containing information and/or data representative of the downstream/outlet pressure of the fluid from the one or more downstream sensors 140. In such embodiments, the valve controller 150 may compare the measured fluid pressure upstream of the valve 110 with the measured fluid pressure downstream of the valve 110. If the measured pressure downstream of the valve 110 exceeds the measured pressure upstream of the valve 110, the valve controller 150 will cause the valve 110 to transition to a CLOSED position in response to the development of a potential backflow condition.

In other embodiments, the one or more downstream sensors 140 may include one or more unidirectional or bidirectional paddle type flow indicators. In such embodiments, the valve controller 150 may receive a signal 142 containing information and/or data representative of either a forward or a reverse fluid flow from the one or more downstream sensors 140. In embodiments using a paddle type flow switch, upon receiving an indication of a reverse fluid flow condition from the one or more downstream sensors 140, the valve controller 150 may cause the valve 110 to transition to a CLOSED position in response to the development of the potential backflow condition.

In other embodiments, the one or more downstream sensors 140 may include one or more mass flow meters, such as a Coriolis mass flowmeter. In such embodiments, the valve controller 150 may receive a signal 142 containing information and/or data representative of the mass and direction of fluid flow from the one or more downstream sensors 140. In such embodiments, upon receiving an indication of a reverse fluid flow condition from the one or more downstream sensors 140, the valve controller 150 may cause the valve 110 to transition to a CLOSED position in response to the development of the potential backflow condition.

In other embodiments, the one or more downstream sensors 140 may include one or more volumetric flow meters, such as a vortex shedding or rotating paddle mass flowmeter. In such embodiments, the valve controller 150 may receive a signal 142 containing information and/or data representative of the volume and direction of fluid flow from the one or more downstream sensors 140. In such embodiments, upon receiving an indication of a reverse fluid flow condition from the one or more downstream sensors 140, the valve controller 150 may cause the valve 110 to transition to a CLOSED position in response to the development of the potential backflow condition.

In embodiments, the valve 110 may include one or more test cock connections 160. The one or more test cock connections 160 may permit the detection of leakage around the seat, seals, or packing of the valve 110. As depicted in FIG. 1, in embodiments, a pressure indicator or pressure transmitter 170 may be operably coupled to the one or more test cock connections 160 to detect leakage around the seat, seals, or packing of the valve 110. In addition, as depicted in FIG. 1, in embodiments, a drain valve 180 may be fluidly coupled to the one or more test cock connections 160 to permit the drainage of any leakage around the seat, seals, or packing of the valve 110. Test cock connections 160 for seal-integrity testing may also include isolation valves fluidly coupled to the inlet and outlet of the valve assembly. Such isolation valves may make it easier for a manual tester use the test cocks 160.

Figure 2:
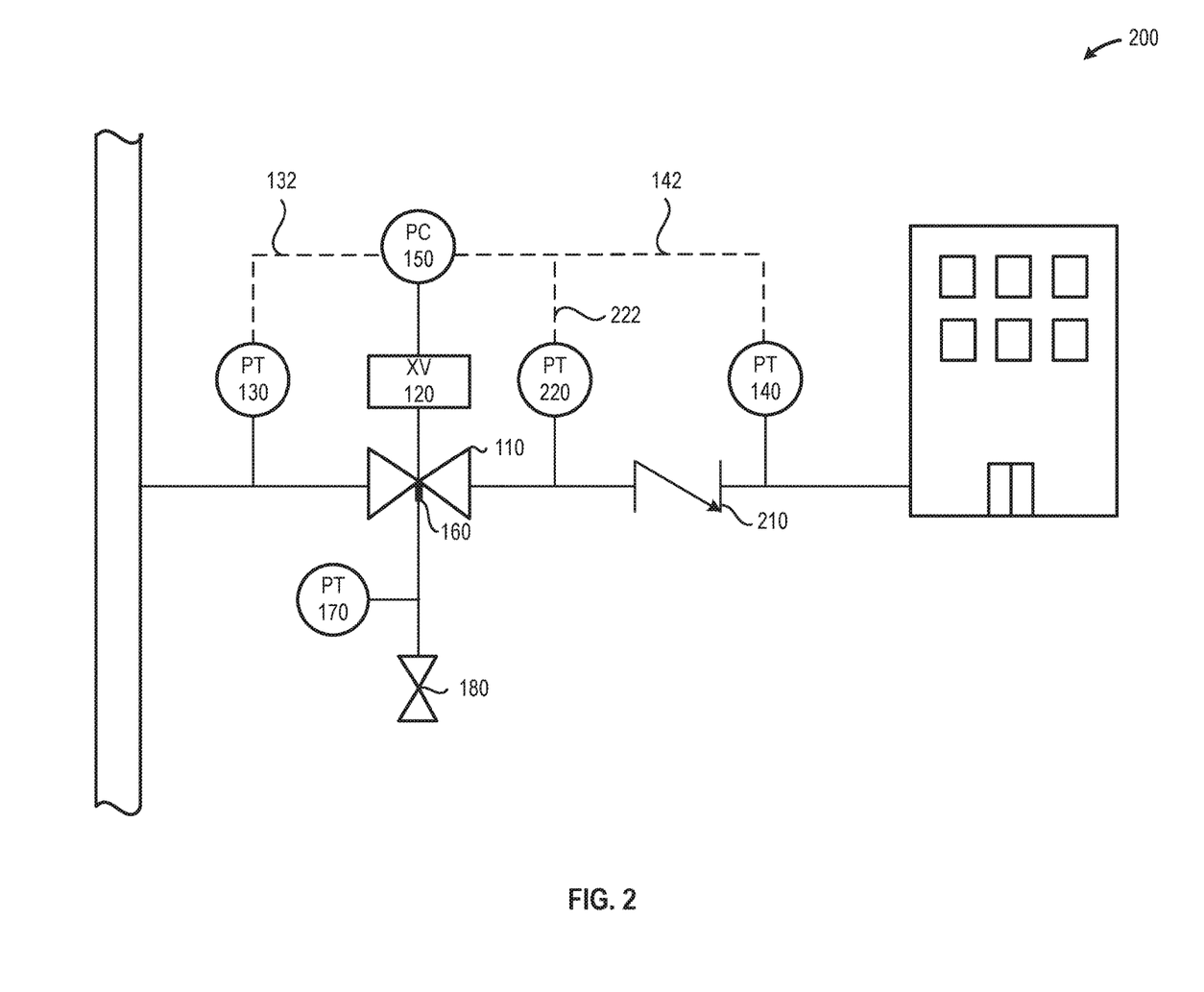
FIG. 2 is a schematic of another illustrative fluid control apparatus that includes the fluid control apparatus depicted in FIG. 1, and additionally includes a qualifying check valve, and one or more intermediate sensors positioned between the valve and the one or more downstream sensors, in accordance with at least one embodiment described herein.

FIG. 2 is a schematic of another illustrative fluid control apparatus/system. One example of the fluid control apparatus/system includes an actuated backflow prevention system 200 that includes the actuated backflow prevention system 100 depicted in FIG. 1, and additionally includes a qualifying check valve 210, and one or more intermediate sensors 220 positioned between the valve 110 and the one or more downstream sensors 140, in accordance with at least one embodiment described herein. As depicted in FIG. 2, the qualifying check valve 210 increases the resistance to reverse or backflow through the valve 110. The qualifying check valve 210 beneficially slows the backflow and provides additional time for the valve controller 120 to transition the valve 110 to the CLOSED position. The one or more intermediate sensors 220 provide to the valve controller 150 additional information and/or data associated with one or more process variables associated with the fluid between the valve 110 and the qualifying check valve 210.

In embodiments, the qualifying check valve 210 may include any size, number, and/or combination of systems and/or devices capable of at least partially preventing the reverse flow of fluid. In at least some embodiments, the qualifying check valve 210 may include one or more gravity or spring-loaded swing or poppet check valves. In other embodiments, the qualifying check valve 210 may include one or more elastomeric reverse flow prevention devices, such as a duckbill valve. The qualifying check valve 210 may beneficially amplify the process variable measured by the one or more downstream sensors 140. For example, where the process variable includes pressure and the one or more downstream sensors 140 include one or more pressure sensors, the presence of the qualifying check valve 210 may cause a transient increase in hydrostatic pressure as the column of fluid impacts the closed qualifying check valve 210. Additionally, the qualifying check valve 210 may induce a large, and easily detectable, non-transient pressure drop from the flow restriction.

In embodiments, the qualifying check valve 210 may include a wafer style check valve (e.g., a butterfly check valve) for insertion between pipe flanges, a flanged check valve, a threaded check valve, or a solder-end connection check valve. The qualifying check valve 210 may be of any size. For example, the qualifying check valve 210 may have a size of: 0.25 inches, 0.375 inches, 0.50 inches, 0.625 inches, 0.75 inches, 1 inch, 1.25 inches, 1.5 inches, 2 inches, 2.5 inches, 3 inches, 4 inches, 6 inches, 8 inches, or 10 inches.

The process variable may include fluid pressure and the one or more intermediate sensors 220 may include one or more pressure sensors. In such embodiments, the one or more intermediate sensors 220 generate at least one output signal 222 that includes information and/or data representative of the fluid pressure between the valve 110 and the qualifying check valve 210. The valve controller 150 may compare the fluid pressure data provided by the one or more intermediate sensors 220 with the fluid pressure data provided by the one or more upstream sensors 130 to determine whether backflow through the valve 110 has occurred.

In embodiments where the process variable includes fluid flow, the one or more intermediate sensors 220 may include one or more unidirectional or bidirectional paddle type flow indicators. In such embodiments, the valve controller 150 may receive the signal 222 containing information and/or data representative of either a forward or a reverse fluid flow from the one or more intermediate sensors 220. In embodiments using a paddle type flow switch, the valve controller 150 may use the fluid flow direction data provided by the one or more intermediate sensors 220 to determine whether backflow through the valve 110 has occurred.

In embodiments where the process variable includes fluid mass flow, the one or more intermediate sensors 220 may include one or more mass flow meters, such as a Coriolis mass flowmeter. In such embodiments, the valve controller 150 may receive the signal 222 containing information and/or data representative of the mass and direction of fluid flow from the one or more intermediate sensors 220. In embodiments using a mass flow sensor, the valve controller 150 may use the fluid flow direction data provided by the one or more intermediate sensors 220 to determine whether backflow through the valve 110 has occurred.

In embodiments where the process variable includes fluid volumetric flow, the one or more intermediate sensors 220 may include one or more volumetric flow meters, such as a vortex shedding or rotating paddle mass flowmeter. In such embodiments, the valve controller 150 may receive a signal 222 containing information and/or data representative of the volume and direction of fluid flow from the one or more intermediate sensors 220. In embodiments using a volumetric flow sensor, the valve controller 150 may use the fluid flow direction data provided by the one or more intermediate sensors 220 to determine whether backflow through the valve 110 has occurred.

Figure 3:
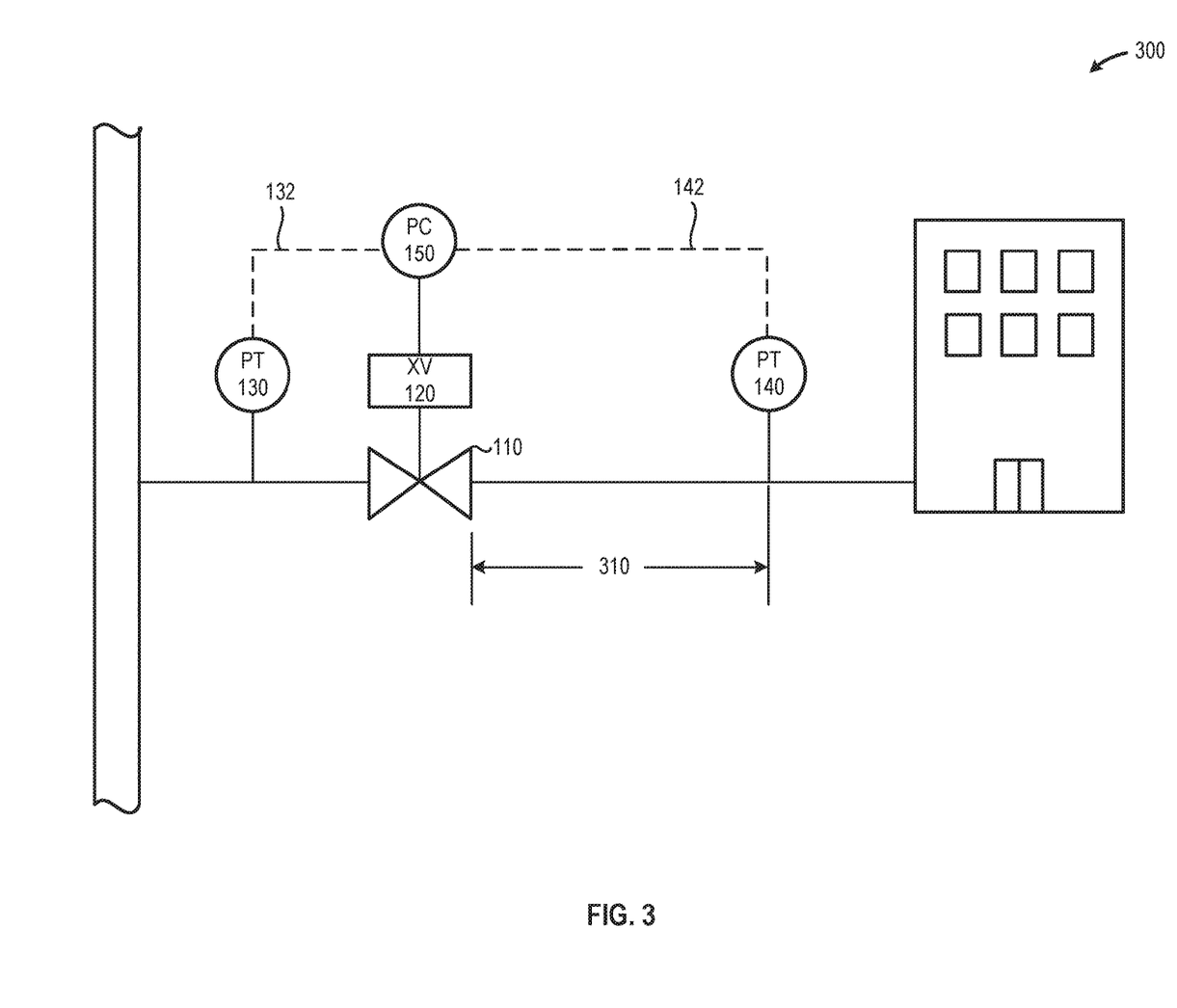
FIG. 3 is a schematic of another illustrative fluid control apparatus that includes the fluid control apparatus depicted in FIG. 1, and additionally includes a run-out length to minimize the possibility of backflow occurring through the valve, in accordance with at least one embodiment described herein.

FIG. 3 is a schematic of another illustrative fluid control apparatus/system. One example of the fluid control apparatus/system includes an actuated backflow prevention system 300 that includes the actuated backflow prevention system 100 depicted in FIG. 1, and additionally includes a run-out length 310 to reduce or eliminate the possibility of backflow occurring through the valve 110, in accordance with at least one embodiment described herein. The actuator 120 transitions the valve 110 over a relatively brief time interval. However, it is possible that a minimal backflow may occur through the valve 110 prior to the actuator transitioning the valve 110 to the CLOSED position. To minimize or even eliminate such backflow, a run-out length 310 may be disposed between the valve 110 and the one or more downstream sensors 140. In embodiments, the run-out length 310 may be determined based upon the time required for the actuator 120 to transition the valve 110 to the CLOSED position and the maximum expected backflow fluid velocity in the system 300. For example, if the actuator 120 requires 0.1 seconds to move the valve 110 to the CLOSED position and the maximum expected backflow fluid velocity is 2 meters/second, the run-out length 310 may be determined as follows:

$$L_{run-out} = T_{close} * V_{backflow} \tag{1}$$

where: $L_{run-out}$=run-out length 310;
$T_{close}$=time required to transition valve 110 to CLOSED position;
$V_{backflow}$=expected fluid backflow velocity.

In the above example, the run-out length would be 0.2 meters or 20 centimeters. Thus, the system 300 would include 20 centimeters of pipe or valve length between the valve 110 and the one or more downstream sensors 140.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any implementation herein, the terms "circuit" and "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware implementations of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other implementations may be implemented as software executed by a programmable control device.

Thus, the present disclosure is directed to systems and methods useful for backflow prevention system that includes an actuated valve, a valve controller, one or more upstream sensors, and one or more downstream sensors. Upon detecting conditions conducive to backflow through the system using either or both the one or more upstream sensors, and the one or more downstream sensors, the valve controller causes the actuated valve to close. The system may be enhanced through the use of a qualifying check valve disposed between the actuated valve and the one or more downstream sensors to slow or impede backflow through the system. The system may be enhanced by inclusion of a run-out length between the actuated valve and the one or more downstream sensors to account for the latency in the actuator causing the valve to transition to the CLOSED position.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing an actuated backflow prevention system.

According to example 1, there is provided a backflow prevention apparatus. The apparatus may include: a valve having an inlet connection and an outlet connection; an actuator operably coupled to the valve; a valve controller operably coupled to the actuator, the valve controller to: receive a first input signal generated by one or more upstream sensors; receive a second input signal generated by a one or more downstream sensors; determine, using at least one of the first input signal or the second input signal whether a reverse flow condition exists downstream of the valve; and responsive to a determination that the reverse flow condition exists downstream of the valve, transition the valve to a CLOSED position.

Example 2 may include elements of example 1 and the apparatus may further include: the one or more upstream sensors; and the one or more downstream sensors.

Example 3 may include elements of any of examples 1 or 2 where the one or more upstream sensors include an upstream directional flow indicator; and the one or more downstream sensors include a downstream directional flow indicator.

Example 4 may include elements of any of examples 1 through 3 where the second input signal comprises a signal that includes data indicative of a reverse flow condition.

Example 5 may include elements of any of examples 1 through 4 where the one or more downstream sensors comprises at least one of: a mass flowmeter or a volumetric flowmeter.

Example 6 may include elements of any of examples 1 through 5 where the second input signal includes data indicative of a reverse flow condition.

Example 7 may include elements of any of examples 1 through 6 where: the one or more downstream sensors include a first pressure indicator; and the one or more downstream sensors include a second pressure indicator.

Example 8 may include elements of any of examples 1 through 7 where the first signal includes data representative of a measured fluid pressure upstream of the valve; and the second signal includes data representative of a measured fluid pressure downstream of the valve.

Example 9 may include elements of any of examples 1 through 8 and where the controller to: compare the fluid pressure downstream of the valve with the fluid pressure upstream of the valve; and responsive to the measured fluid pressure downstream of the valve exceeding the measured fluid pressure upstream of the valve, determine that a reverse flow condition exists.

Example 10 may include elements of any of examples 1 through 9 where the actuator comprises a pneumatic actuator.

Example 11 may include elements of any of examples 1 through 10 where the actuator comprises a spring-loaded actuator.

Example 12 may include elements of any of examples 1 through 11 where the actuator comprises an electrically operated actuator.

Example 13 may include elements of any of examples 1 through 12 and the apparatus may further include an energy storage device operably coupled to the electric actuator.

Example 14 may include elements of any of examples 1 through 13 where the energy storage device comprises at least one of: a secondary battery, an ultracapacitor, and a supercapacitor.

Example 15 may include elements of any of examples 1 through 14 and the apparatus may further include an energy collection or an energy scavenging device operably coupled to the electric actuator.

Example 16 may include elements of any of examples 1 through 15 and the apparatus may further include: one or more qualifying check valves disposed between the valve and the one or more downstream sensors.

Example 17 may include elements of any of examples 1 through 16 and the apparatus may further include: one or more intermediate sensors disposed between the valve and the qualifying check valve.

Example 18 may include elements of any of examples 1 through 17 where the one or more upstream sensors include one or more pressure sensors; where the one or more downstream sensors include one or more pressure sensors; and where the one or more intermediate sensors include one or more pressure sensors.

Example 19 may include elements of any of examples 1 through 18 and the apparatus may further include: a run-out length between the valve and the one or more downstream sensors; where the run-out length includes a length determined using: a time needed for the actuator to transition the valve to the CLOSED position; and an expected backflow velocity through the valve.

Example 20 may include elements of any of examples 1 through 19 and the apparatus may further include: a leak detection sensor fluidly coupled to the valve, the leak detection sensor to detect a flow of fluid beneath a valve seat included in the valve.

Example 21 may include elements of any of examples 1 through 20 where the leak detection sensor includes at least one pressure sensor.

Example 22 may include elements of any of examples 1 through 21 and the valve controller may further: position the valve with an offset when the actuator transitions the valve to an OPEN position.

Example 23 may include elements of any of examples 1 through 22 where the valve includes a quarter-turn valve.

Example 24 may include elements of any of examples 1 through 23 where the quarter-turn valve comprises at least one of: a two-way ball valve and a three-way ball valve.

Example 25 may include elements of any of examples 1 through 24 and the apparatus may further include: a valve positioned operably coupled to the actuator, the valve positioner to permit the valve controller to position the valve at one or more intermediate positions between the OPEN position and the CLOSED position.

Example 26 may include elements of any of examples 1 through 25 and the valve controller may be is further to determine, using at least one of the first input signal or the second input signal, whether a trigger event exists downstream of the valve; and responsive to a determination that the trigger event exists downstream of the valve, adjust a position of the valve.

Example 27 may include elements of any of examples 1 through 26, and the trigger event may include at least one of a flood detection and/or a pressure downstream of the valve being outside of a target.

Example 28 may include elements of any of examples 1 through 27, and the valve controller may be further configured to determine, using at least one of the first input signal or the second input signal, whether a flood condition exists downstream of the valve; and responsive to a determination that the flood condition exists downstream of the valve, transition the valve to the CLOSED position.

Example 29 may include elements of any of examples 1 through 28, and the valve controller may be further configured to determine, using at least one of the first input signal or the second input signal, that a pressure downstream of the valve is outside of a target; and responsive to a determination that the pressure downstream of the valve is outside of the target, change a position of the valve to adjust the pressure to the target.

Example 30 may include elements of any of examples 1 through 29, and the target may be a pressure range.

Example 31 may include elements of any of examples 1 through 30, and the target may be a maximum or minimum pressure threshold.

According to example 32, there is provided a fluid control apparatus. The fluid control apparatus may include a valve having an inlet connection and an outlet connection, an actuator operably coupled to the valve, and a valve controller operably coupled to the actuator. The valve controller may be configured to receive a first input signal generated by one or more upstream sensors, receive a second input signal generated by one or more downstream sensors, determine, using at least one of the first input signal or the second input signal whether a trigger event exists downstream of the valve, and responsive to a determination that the trigger event exists downstream of the valve, adjust a position of the valve.

Example 33 may include any of the elements of example 32, and the trigger event may include one or more of a reverse flow condition, a flood condition, and/or a pressure downstream of the valve being outside of a target.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A backflow prevention apparatus for potable water, comprising:
    one or more upstream sensors, wherein the one or more upstream sensors include at least one of a pressure sensor or a flow sensor;
    one or more downstream sensors, wherein the one or more downstream sensors include at least one of a pressure sensor or a flow sensor;
    a valve having an inlet connection and an outlet connection;
    an actuator operably coupled to the valve;
    a valve controller operably coupled to the actuator, the valve controller configured to:
        receive a first input signal generated by the one or more upstream sensors indicative of one or more process variable associated with a fluid flow upstream of the valve;
        receive a second input signal generated by the one or more downstream sensors indicative of one or more process variable associated with a fluid flow downstream of the valve;
        determine, using at least the first input signal and the second input signal whether a reverse flow condition exists downstream of the valve; and
        responsive to a determination that the reverse flow condition exists downstream of the valve, transition the valve to a CLOSED position to prevent flow through the valve from the outlet connection to the inlet connection; and
    one or more qualifying check valves disposed between the valve and the one or more downstream sensors.

2. The apparatus of claim 1 wherein:
    the one or more upstream sensors include an upstream directional flow indicator; and
    the one or more downstream sensors include a downstream directional flow indicator.

3. The apparatus of claim 2 wherein the second input signal comprises a signal that includes data indicative of a reverse flow condition.

4. The apparatus of claim 1 wherein:
    the one or more downstream sensors include a first pressure indicator; and
    the one or more downstream sensors include a second pressure indicator.

5. The apparatus of claim 4 wherein:
    the first signal includes data representative of a measured fluid pressure upstream of the valve;
    and the second signal includes data representative of a measured fluid pressure downstream of the valve.

6. The apparatus of claim 5 wherein the controller is configured to:
    compare the fluid pressure downstream of the valve with the fluid pressure upstream of the valve; and responsive to the measured fluid pressure downstream of the valve exceeding the measured fluid pressure upstream of the valve, determine that a reverse flow condition exists.

7. The apparatus of claim 1 wherein the actuator comprises a pneumatic actuator.

8. The apparatus of claim 7 wherein the actuator comprises a spring-loaded actuator.

9. The apparatus of claim 1 wherein the actuator comprises an electrically operated actuator.

10. The apparatus of claim 9 further comprising a energy storage device operably coupled to the electric actuator.

11. The apparatus of claim 10 wherein the energy storage device comprises at least one of: a secondary battery, an ultracapacitor, and a supercapacitor.

12. The apparatus of claim 9 further comprising an energy collection or an energy scavenging device operably coupled to the electric actuator.

13. The apparatus of claim 1, further comprising one or more intermediate sensors disposed between the valve and the qualifying check valve.

14. The apparatus of claim 13:
wherein the one or more upstream sensors include one or more pressure sensors;
wherein the one or more downstream sensors include one or more pressure sensors; and
wherein the one or more intermediate sensors include one or more pressure sensors.

15. The apparatus of claim 1, further comprising a leak detection sensor fluidly coupled to the valve, the leak detection sensor to detect a flow of fluid beneath a valve seat included in the valve.

16. The apparatus of claim 15 wherein the leak detection sensor includes at least one pressure sensor.

17. The apparatus of claim 1, the valve controller is further configured to:
position the valve with an offset when the actuator transitions the valve to an OPEN position.

18. The apparatus of claim 1 wherein the valve includes a quarter-turn valve.

19. The apparatus of claim 18 wherein the quarter-turn valve comprises at least one of: a two-way ball valve and a three-way ball valve.

20. The apparatus of claim 1, further comprising a valve positioner operably coupled to the actuator, the valve positioner to permit the valve controller to position the valve at one or more intermediate positions between the OPEN position and the CLOSED position.

21. The apparatus of claim 1 wherein the valve controller is further configured to:
determine, using at least one of the first input signal or the second input signal, whether a trigger event exists downstream of the valve; and
responsive to a determination that the trigger event exists downstream of the valve, adjust a position of the valve.

22. The apparatus of claim 21 wherein the trigger event includes at least one of a flood detection and/or a pressure downstream of the valve being outside of a target.

23. The apparatus of claim 1 wherein the valve controller is further configured to:
determine, using at least one of the first input signal or the second input signal, whether a flood condition exists downstream of the valve; and
responsive to a determination that the flood condition exists downstream of the valve, transition the valve to the CLOSED position.

24. The apparatus of claim 1 wherein the valve controller is further to:
determine, using at least one of the first input signal or the second input signal, that a pressure downstream of the valve is outside of a target; and
responsive to a determination that the pressure downstream of the valve is outside of the target, change a position of the valve to adjust the pressure to the target.

25. The apparatus of claim 24, wherein the target is a pressure range.

26. The apparatus of claim 24, wherein the target is a maximum or minimum pressure threshold.

27. The apparatus of claim 1, wherein the actuator operably coupled to the valve and configured to move the valve between only an OPEN position and the CLOSED position, the actuator further configured to position the valve to create a pressure drop of less than 5.0 psi through the valve when the valve is the OPEN position.

28. The apparatus of claim 27, wherein the actuator is further configured to position the valve to create a pressure drop of less than 1.0 psi through the valve when the valve is the OPEN position.

29. The apparatus of claim 1, further comprising a run-out length between the valve and the one or more downstream sensors, wherein the run-out length is based on a time needed for the actuator to transition the valve to the CLOSED position and an expected backflow velocity through the valve.

30. A backflow prevention apparatus for potable water, comprising:
one or more upstream sensors;
one or more downstream sensors;
a valve having an inlet connection and an outlet connection;
an actuator operably coupled to the valve;
a valve controller operably coupled to the actuator, the valve controller configured to:
receive a first input signal generated by the one or more upstream sensors indicative of one or more process variable associated with a fluid flow upstream of the valve;
receive a second input signal generated by the one or more downstream sensors indicative of one or more process variable associated with a fluid flow downstream of the valve;
determine, using at least one of the first input signal or the second input signal whether a reverse flow condition exists downstream of the valve; and
responsive to a determination that the reverse flow condition exists downstream of the valve, transition the valve to a CLOSED position to prevent flow through the valve from the outlet connection to the inlet connection;
wherein the one or more downstream sensors comprises at least one of: a mass flowmeter or a volumetric flowmeter.

31. The apparatus of claim 30 wherein the second input signal includes data indicative of a reverse flow condition.

32. A backflow prevention apparatus for potable water, comprising:
one or more upstream sensors;
one or more downstream sensors;
a valve having an inlet connection and an outlet connection;
an actuator operably coupled to the valve;
a valve controller operably coupled to the actuator, the valve controller configured to:

receive a first input signal generated by the one or more upstream sensors indicative of one or more process variable associated with a fluid flow upstream of the valve;

receive a second input signal generated by the one or more downstream sensors indicative of one or more process variable associated with a fluid flow downstream of the valve;

determine, using at least the first input signal and the second input signal whether a reverse flow condition exists downstream of the valve; and responsive to a determination that the reverse flow condition exists downstream of the valve, transition the valve to a CLOSED position to prevent flow through the valve from the outlet connection to the inlet connection; and a run-out length between the valve and the one or more downstream sensors;

wherein the run-out length is based on a time needed for the actuator to transition the valve to the CLOSED position and an expected backflow velocity through the valve.

* * * * *